(12) United States Patent
Fukawatase et al.

(10) Patent No.: US 8,448,983 B2
(45) Date of Patent: May 28, 2013

(54) OCCUPANT RESTRAINT DEVICE

(75) Inventors: Osamu Fukawatase, Nishikamo-gun (JP); Takahiro Sugiyama, Toyota (JP); Toshiki Kondo, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 326 days.

(21) Appl. No.: 12/835,381

(22) Filed: Jul. 13, 2010

(65) Prior Publication Data

US 2011/0006507 A1 Jan. 13, 2011

(30) Foreign Application Priority Data

Jul. 13, 2009 (JP) ................................. 2009-164674

(51) Int. Cl.
*B60R 21/18* (2006.01)
(52) U.S. Cl.
CPC ..................................... *B60R 21/18* (2013.01)
USPC .......................................... 280/733; 280/808
(58) Field of Classification Search
CPC ..................................................... B60R 21/18
USPC .................... 280/733, 730.1, 743.1, 808, 807
See application file for complete search history.

(56) References Cited

U.S. PATENT DOCUMENTS

| | | | | |
|---|---|---|---|---|
| 3,869,145 A | * | 3/1975 | Takada | 280/733 |
| 3,953,640 A | * | 4/1976 | Takada | 428/188 |
| 5,472,231 A | * | 12/1995 | France | 280/733 |
| 5,642,902 A | * | 7/1997 | France | 280/737 |
| 5,839,753 A | * | 11/1998 | Yaniv et al. | 280/733 |
| 6,126,194 A | * | 10/2000 | Yaniv et al. | 280/733 |
| 6,168,194 B1 | * | 1/2001 | Cuevas et al. | 280/730.2 |
| 6,244,621 B1 | * | 6/2001 | Kameyoshi et al. | 280/733 |
| 6,336,657 B1 | * | 1/2002 | Akaba et al. | 280/733 |
| 6,406,059 B1 | * | 6/2002 | Taubenberger et al. | 280/733 |
| 6,508,486 B1 | * | 1/2003 | Welch et al. | 280/730.2 |
| 6,890,000 B2 | * | 5/2005 | Taubenberger et al. | 280/733 |
| 7,237,799 B2 | * | 7/2007 | Clute | 280/733 |
| 7,398,995 B2 | * | 7/2008 | Kokeguchi | 280/733 |
| 7,481,451 B2 | * | 1/2009 | Park | 280/733 |
| 7,641,233 B2 | * | 1/2010 | Korechika | 280/753 |

(Continued)

FOREIGN PATENT DOCUMENTS

| | | |
|---|---|---|
| JP | 56-157649 A | 12/1981 |
| JP | 2002-527282 A | 8/2002 |
| JP | 2002-529310 A | 9/2002 |
| JP | 2008-137456 A | 6/2008 |
| JP | 2008290698 A | 12/2008 |
| JP | 2009-001223 A | 1/2009 |

*Primary Examiner* — Paul N Dickson
*Assistant Examiner* — Karen Beck
(74) *Attorney, Agent, or Firm* — Gifford, Krass, Sprinkle, Anderson & Citkowski, P.C.

(57) ABSTRACT

An air belt device includes: a seat belt that restrains a seated occupant; an air belt that is provided in a shoulder belt portion of the seat belt and that is deployed when supplied with a gas; a retractor that extractably winds up the seat belt from a side of a shoulder portion of the occupant; an inflator that supplies gas to the air belt; and a flexible hose that is curved when the seat belt is not worn and that communicates the inflator with the end of the air belt that extends into the seat back.

5 Claims, 9 Drawing Sheets

U.S. PATENT DOCUMENTS

| | | | |
|---|---|---|---|
| 7,677,598 B1 * | 3/2010 | Ryan et al. | 280/730.2 |
| 7,798,522 B2 * | 9/2010 | Itoga | 280/730.1 |
| 2005/0263990 A1 * | 12/2005 | Clute | 280/733 |
| 2007/0126213 A1 * | 6/2007 | Korechika | 280/730.2 |
| 2009/0134612 A1 * | 5/2009 | Itoga | 280/733 |
| 2009/0267332 A1 * | 10/2009 | Clute | 280/733 |
| 2011/0006507 A1 * | 1/2011 | Fukawatase et al. | 280/733 |
| 2011/0042925 A1 * | 2/2011 | Lin | 280/733 |

* cited by examiner

OCCUPANT RESTRAINT DEVICE

INCORPORATION BY REFERENCE

The disclosure of Japanese Patent Application No. 2009-164674 filed on Jul. 13, 2009 including the specification, drawings and abstract is incorporated herein by reference in its entirety.

BACKGROUND OF THE INVENTION

1. Field of the Invention

The present invention relates to an occupant restraint device that protects an occupant of a vehicle.

2. Description of the Related Art

Japanese Patent Application Publication No. 2008-290698 (JP-A-2008-290698) describes a seat belt device in which the upper end of the webbing is fixed to an adjustable plate in a seat back via a fixation bracket, the lower end of the webbing is extractably wound around a retractor provided in a seat cushion, and an air bag that may be deployed to one side of the head of a driver is provided at an upper portion of the webbing, for example. In the seat belt device, the air bags are connected to an air pump fixed to a seat back board via an elastic tube to allow relative displacement of the adjustable plate with respect to the air pump.

In the above configuration, the webbing cannot be extracted from the side of the shoulders, and thus are not easily wearable. In addition, a structure in which a gas from an inflator is supplied from the side of buckles is highly restrictive.

SUMMARY OF THE INVENTION

The present invention provides an occupant restraint device that supplies a gas to an expandable portion while securing the wearability of a seat belt.

An aspect of the present invention relates to an occupant restraint device. The occupant restraint device includes: a seat belt that restrains an occupant, wherein the seat belt includes an expandable portion provided at a portion of the seat belt that extends from a shoulder portion to a waist of the occupant when the seat belt is worn by the occupant, and the expandable portion expands when supplied with gas; a retractor that allows the seat belt to be extracted and wound up from a side of the shoulder portion; an inflator supplies the gas to the expandable portion; and a flow path member that is flexible, and that communicates an end of the expandable portion oriented towards the retractor with the inflator, wherein the flow path member has a curved shape when the seat belt is not worn by the occupant.

In the occupant restraint device that is described above, the occupant extracts the seat belt which is wound up in the retractor from the shoulder portion side to wear the seat belt. Therefore, the occupant can easily wear the seat belt. When the inflator is actuated, a gas is supplied from the inflator to the expandable portion through the flexible flow path member. Thus, the expandable portion is expanded and developed to contribute to the protection of the occupant.

The inflator and the expandable portion are communicated with each other via the flexible flow path member. Thus, in a configuration in which the seat belt which is wound up in the retractor is extracted from a side of a shoulder portion of the occupant, it is possible to supply a gas to the expandable portion from the retractor side. That is, the flexible flow path member is formed to have a curved shape when the seat belt is not worn, and is straightened (uncurved) to follow the extraction of the seat belt when the seat belt is worn, allowing the gas to be supplied to the expandable portion which is provided in the seat belt.

According to the occupant restraint device that is described above, it is possible to suitably supply a gas to an expandable portion while securing the wearability of a seat belt.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An air belt device 10, which serves as an occupant restraint device according to a first embodiment of the present invention, will be described with reference to FIGS. 1 to 6. The arrows FR, UP, IN, and OUT, which are occasionally used in the drawings, respectively indicate the forward direction and upward direction, as well as the inward direction and outward direction in the vehicle width direction of an automobile to which the air belt device 10 is applied, and generally match the orientation of the vehicle seat 11 in which the air belt device 10 is provided.

Figure 1:
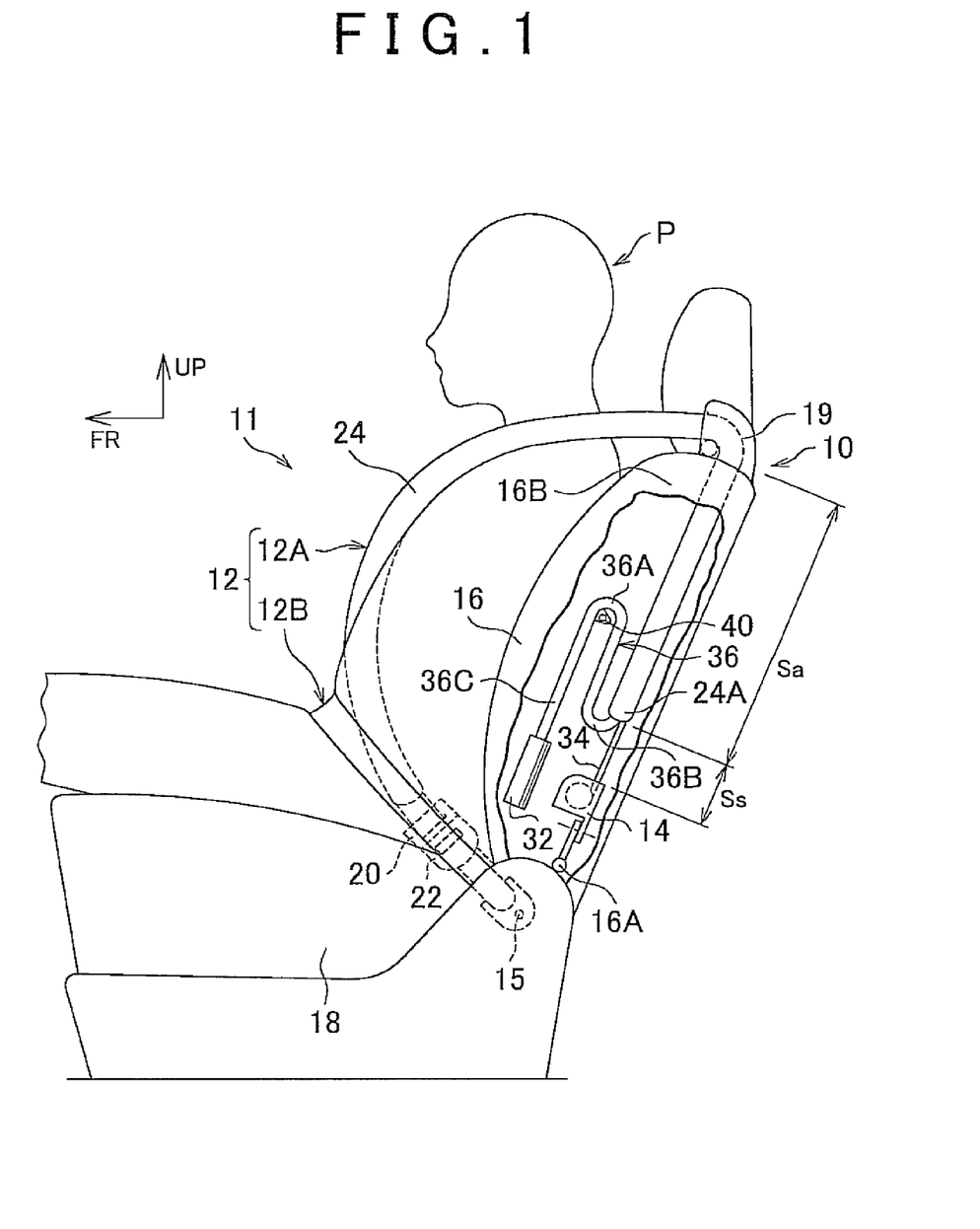
FIG. 1 is a side view that schematically shows an occupant wearing a seat belt of an air belt device according to a first embodiment of the present invention.
Figure 4:
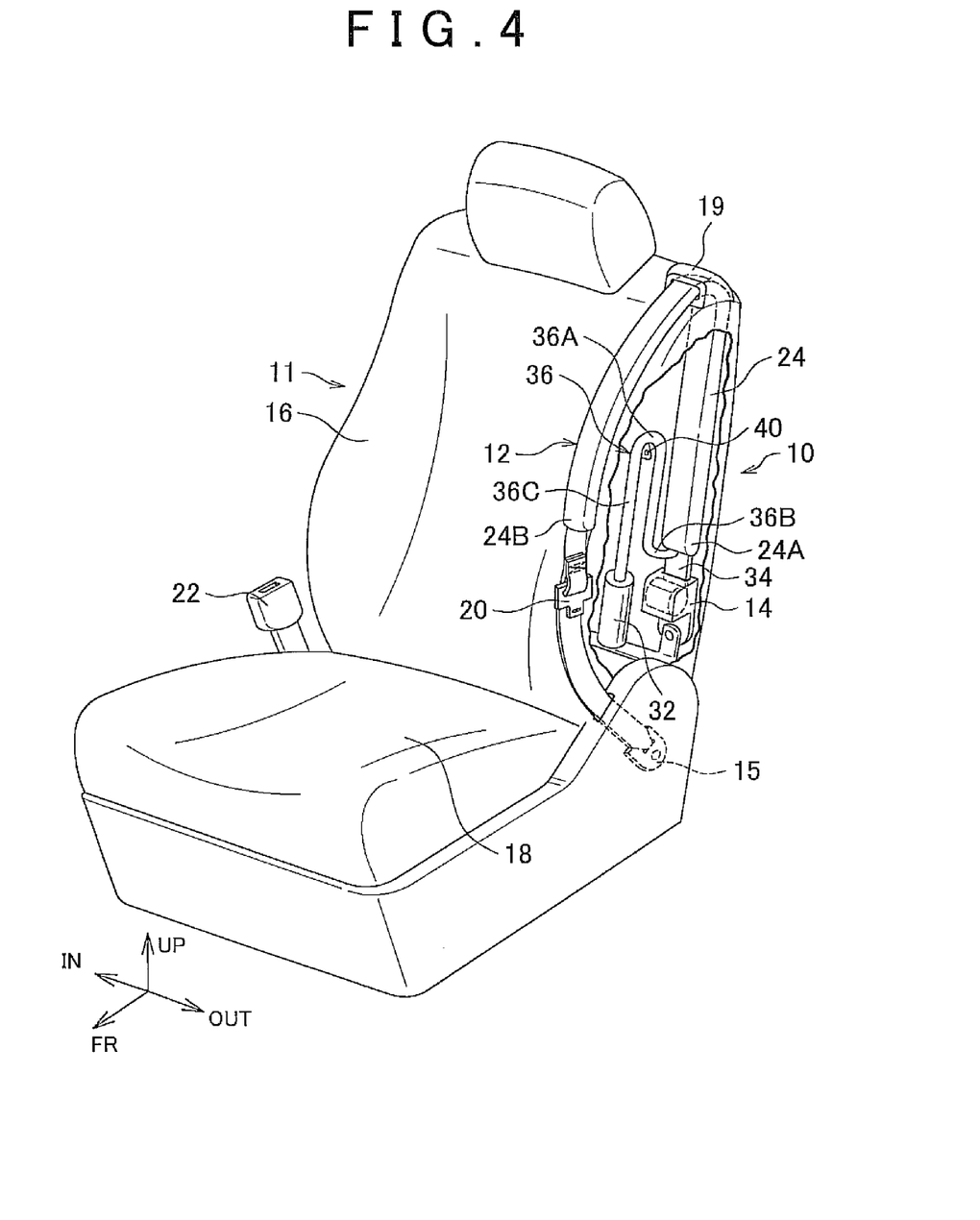
FIG. 4 is a perspective view that schematically shows the seat belt of the air belt device according to the first embodiment of the present invention is retracted.

FIG. 4 is a perspective view that shows the air belt device 10 when not in use (i.e., the seat belt 12 is not worn). As shown in the drawing, the air belt device 10 includes a seat belt 12 that restrains an occupant P. One end of the seat belt 12 is extractably wound in a retractor 14 that serves as a winding device. In the embodiment, the retractor 14 is provided at a lower end and outboard side of a seat back 16 of the vehicle seat 11 in a lateral direction of the vehicle. As shown in FIG. 1, the retractor 14 is fixed to a seat back frame 16A that forms the seat back 16.

However, as shown in FIG. 4, the other end of the seat belt 12 is fixed via an anchor 15 to the outboard side of the rear of a seat cushion 18 of the vehicle seat 11. Thus, when the seat belt 12 is not worn by the occupant, it extends in the vertical direction of the vehicle along the outboard edge of the seat back 16. As shown in FIG. 1, a middle portion of the seat belt 12 (an air belt 24 to be discussed later) passes through a belt guide 19 that is provided at a shoulder portion 16B of the seat back 16, and the middle portion of the seat belt 12 is extracted toward the front side of the vehicle from the inside of the seat back 16 while being guided by the belt guide 19.

When the seat belt 12 is not worn, a tongue plate 20 is provided generally at the middle, in the vertical direction of the vehicle, portion of the seat belt 12 that is exposed to the front side of the seat back 16. The tongue plate 20 is may be removably engaged with a buckle 22 that is disposed on the inboard side of the vehicle seat 11 in the lateral direction of the vehicle. In the air belt device 10, when the tongue plate 20 is engaged with the buckle 22, the shoulder belt portion 12A extends from the shoulder portion of the seat back 16 obliquely across the upper body of the occupant, which is an upper body restraint section which extends from the shoulder portion of the seat back 16, to the tongue plate 20, thereby restraining the upper body of the occupant.

As shown in FIG. 1, the shoulder belt portion 12A of the seat belt 12 restrains the upper body of the seated occupant P, and the lap belt portion 12B, which extends from the tongue plate 20 to the anchor 15, restrains the waist of the seated occupant P. Thus, the air belt device 10 according to the embodiment serves as a three-point restraining device.

An air belt 24 that serves as an expandable portion and is deployed when inflated with gas supplied from an inflator (not shown) is at least partially provided in the shoulder belt portion 12A of the seat belt 12.

Figure 2:
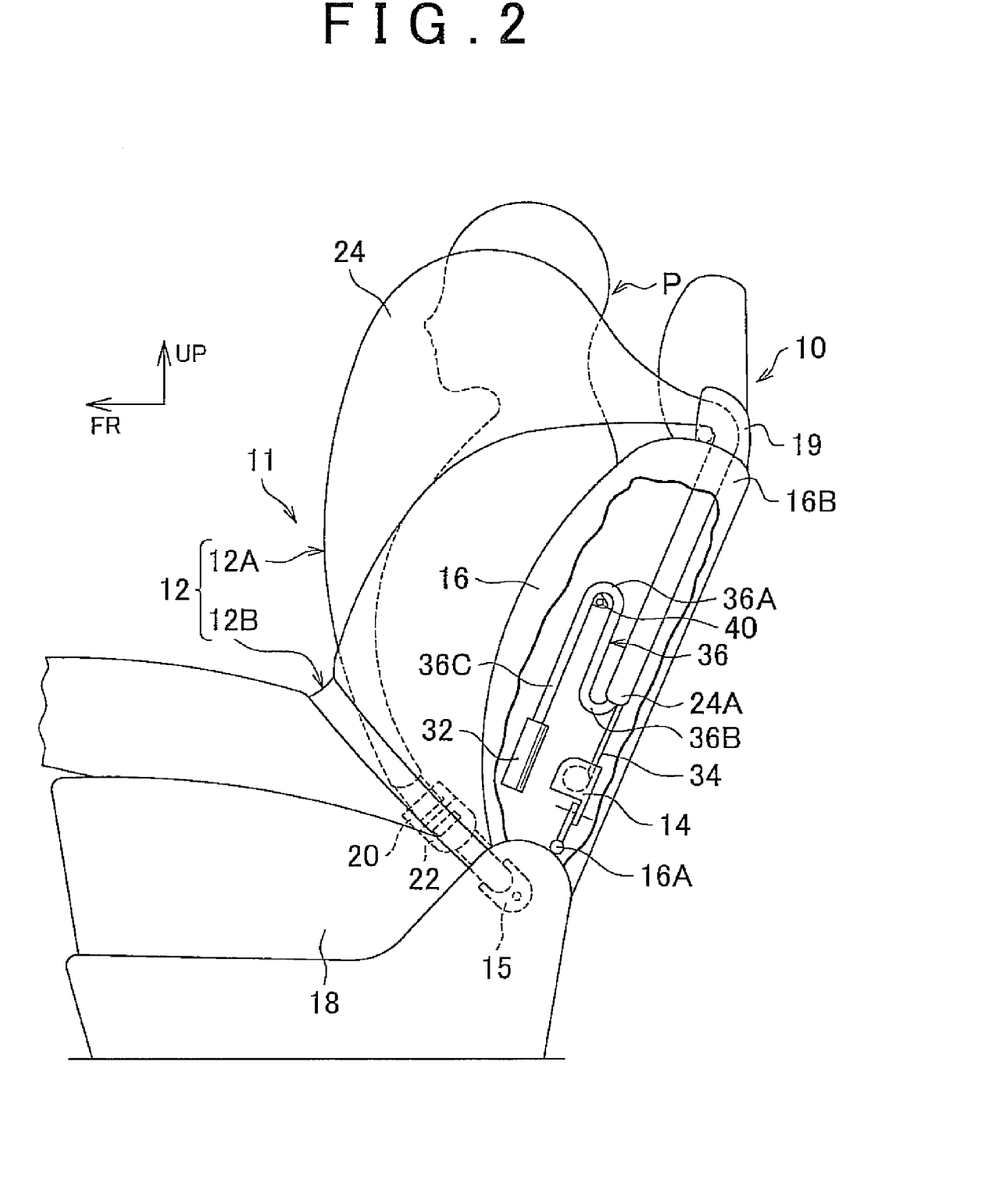
FIG. 2 is a side view that schematically shows the air belt of the air belt device according to the first embodiment when deployed.
Figure 6:
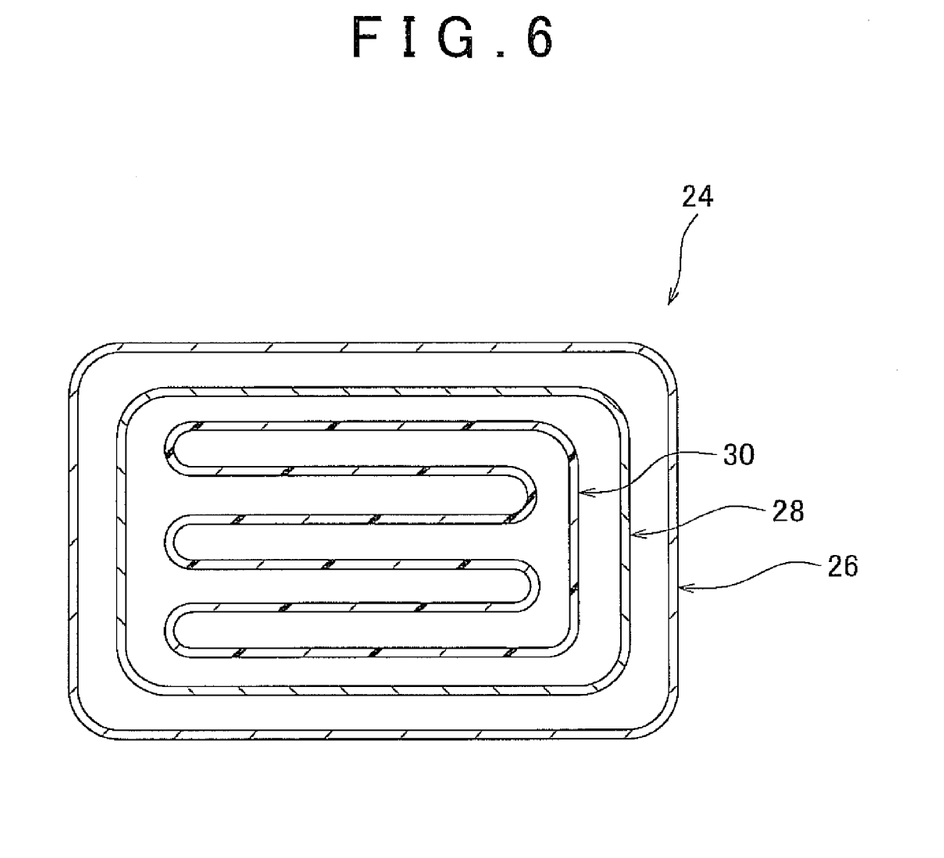
FIG. 6 is a cross-sectional view of the air belt of the air belt device according to the first embodiment of the present invention.

As shown in FIG. 6, the air belt 24 includes as its main components a cover 26 that serves as a belt main body, an expandable/contractible mesh webbing 28 that is provided inside the cover 26, and a folded air bag 30 that is provided within the mesh webbing 28. When the air belt 24 is supplied with a gas from an inflator 32 through a flexible hose 36, the air bag 30 expands and thus the air belt 24 is deployed as shown in FIG. 2.

When the seat belt 12 not worn, as shown in FIG. 4, the end 24A of the air belt 24 opposite the tongue plate 20 is positioned directly above the retractor 14, while only a portion of the seat belt 12 other than the air belt 24 (hereinafter occasionally referred to as a "webbing 34") is wound up in the retractor 14. The webbing 34 may be sewn to the cover 26 of the air belt 24.

Figure 3:
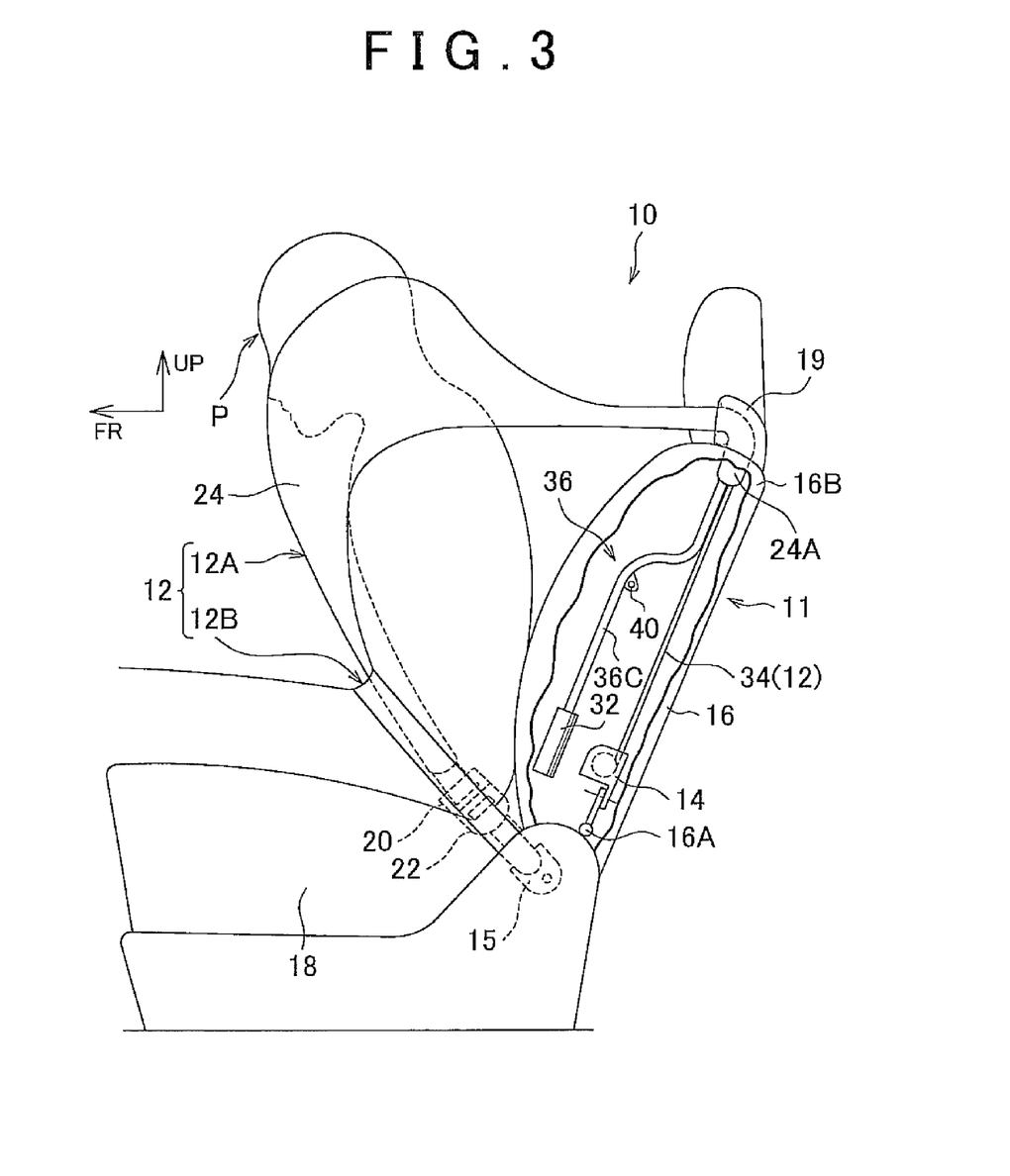
FIG. 3 is a partially cutaway side view that schematically shows energy is absorbed by the air belt device according to the first embodiment of the present invention.

In the embodiment, also, the end 24A of the air belt 24 is positioned in a lower portion, in the vertical direction of the vehicle, of the seat back 16 when the seat belt 12 is worn by the seated occupant P, as shown in FIG. 1. In the embodiment, further, the end 24A of the air belt 24 does not spool out from the seat back 16 when the seat belt 12 restrains the seated occupant P (absorbs energy) as shown in FIG. 3. That is, as shown in FIG. 1, the retractor 14 is fixed and the air belt 24 is installed so that a wearing stroke Ss that allows the seated occupant P to wear the seat belt 12 and an energy absorbing stroke Sa for energy absorption are provided within the height of the seat back 16.

As shown in FIG. 4, the other end 24B of the air belt 24 is positioned near the tongue plate 20. Thus, the air belt 24 is configured to extend over substantially the entire length of the shoulder belt portion 12A when the seat belt 12 is worn by the occupant P seated on the vehicle seat 11.

The inflator 32, which feeds a gas when actuated, is fixed to the seat back frame 16A at a lower and inboard side of the retractor 14 via a bracket (not shown). The inflator 32 and the end 24A of the air belt 24 are communicated with each other through a flexible hose 36, which serves as a flexible flow path member, so that a gas may be supplied from the inflator 32 to the air belt 24 (the air bag 30).

The flexible hose 36 is curved when the seat belt 12 is not worn by the seated occupant P. Specifically, as shown in FIG. 4, the flexible hose 36 is connected to the inflator 32 from above, folded back twice, and connected to the end 24A of the air belt 24 from below. The double fold of the flexible hose 36 is maintained even when the seat belt 12 is worn by the seated occupant P as shown in FIG. 1.

When the seat belt 12 is not worn by the seated occupant P, as shown in FIG. 4, the end of the flexible hose 36 connected to the inflator 32 is generally at the same height as the end of the flexible hose 36 that is connected to the end 24A of the air belt 24 in the vertical direction of the vehicle. The length of the flexible hose 36 when taut is longer than the combined length of the wearing stroke Ss and the energy absorbing stroke Sa. Therefore, the flexible hose 36 is not fully straightened at the final stage of energy absorption as shown in FIG. 3.

Figure 5A:
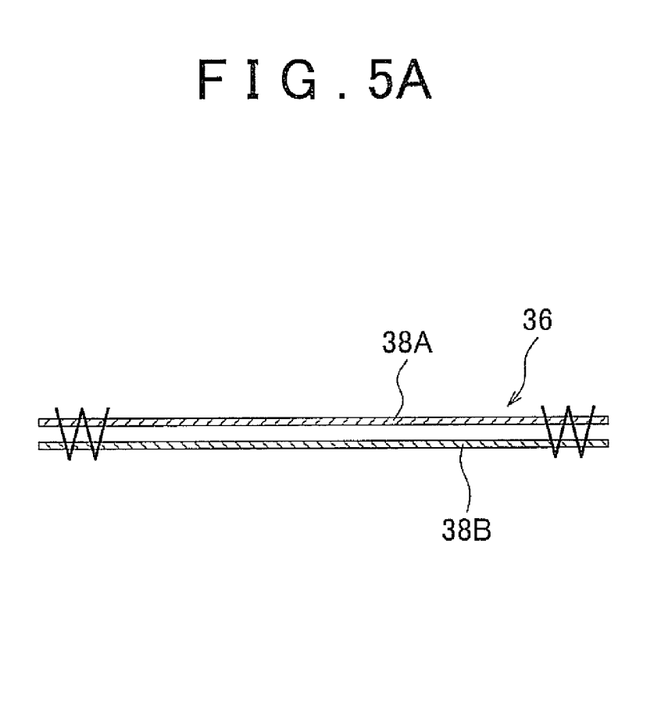
FIG. 5A shows a cross-sectional view of a flexible hose included in the air belt device according to the first embodiment when gas is not flowing through it.
Figure 5B:
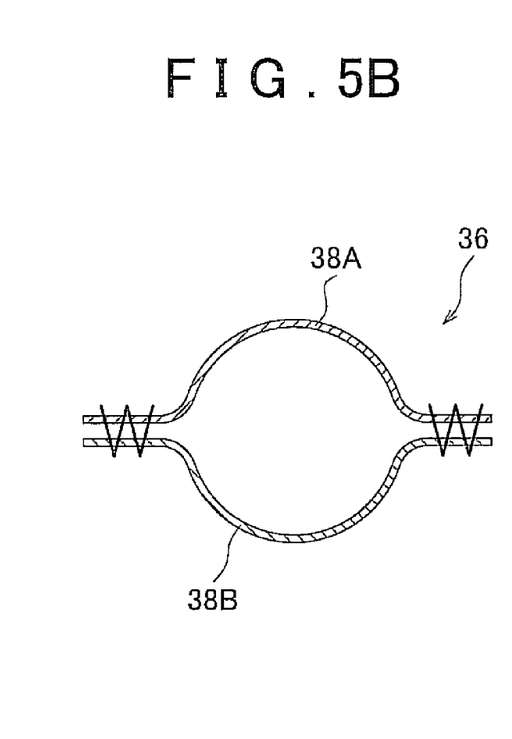
FIG. 5B shows a cross-sectional view of the flexible hose included in the air belt device according to the first embodiment of the present invention when gas flows through the flexible hose.

The flexible hose 36 is not formed by folding a straight hose, but is initially formed in the double folded shape as described above. That is, the length of the base material of the flexible hose 36 is different between the inner circumferential side and the outer circumferential side at two folded back portions 36A and 36B. In the embodiment, the flexible hose 36 is formed by sewing two base materials 38A and 38B along the length of the flexible hose 36 as shown in FIG. 5A, with the base material 38A or 38B that forms the outer circumferential side of the flexible hose 36 longer than the base material 38B or 38A that forms the inner circumferential side at the two folded back portions 36A and 36B. Consequently, the flow path in the flexible hose 36 does not collapse when folded at the two folded back portions 36A and 36B. FIG. 5B shows a state in which the flexible hose 36 is expanded by a gas flow. The difference between the inner and outer circumferences at the curved portions that is described above may be set in consideration of the expansion of the flexible hose 36. The base materials 38A and 38B may be the same in configuration as the base material forming the air bag 30.

Further, as shown in FIGS. 1 to 4, the flexible hose 36 includes an engagement piece 40 serving as a supported portion for engagement with the seat back frame 16A (the engagement state is not shown). The engagement piece 40 is provided near the boundary between a straight portion 36C, which extends from the inflator 32, and the folded back portion 36A and on the inner circumferential side of the folded back portion 36A. Consequently, the portion of the flexible hose 36 engaged with the seat back frame 16A does not block the flexible hose 36 from being pulled upward (toward the downstream side) at the initial stage of gas supply.

The functions of the first embodiment will be described next.

In the air belt device 10 described above, when the occupant P seated on the vehicle seat 11 extracts the seat belt 12 from the retractor 14 to engage the tongue plate 20 with the buckle 22, the shoulder belt portion 12A extends over the upper body of the seated occupant P and the lap belt portion 12B extends over the waist of the seated occupant P as schematically shown in FIG. 1.

When it is detected or predicted that a frontal collision of the vehicle equipped with the vehicle seat 11 occurs (or is unavoidable), an ECU actuates the inflator 32. As a result, a gas is supplied from the inflator 32 to the air bag 30 in the air belt 24 via the flexible hose 36. This allows the air belt 24 to be deployed into a specified shape as shown in FIG. 2.

Then, when the seated occupant P moves toward the front of the vehicle due to inertia as a result of the collision, the retractor 14 allows the seat belt 12 to be extracted while applying a restraining load associated with deformation of an energy absorbing member such as a torsion bar (not shown). This allows the seat belt 12 (the air belt 24) to be extracted from the retractor 14 (the seat back 16) as shown in FIG. 3 to absorb collision energy. When the seat belt 12 is extracted from the retractor 14 to the limit, no further extraction of the seat belt 12 is allowed.

In the air belt device 10, the inflator 32 and the air belt 24 are communicated with each other via the flexible hose 36. Thus, when the seat belt 12, which is wound up in the retractor 14, is extracted from a side of a shoulder of the seated occupant P (the shoulder portion 16B of the seat back 16), gas can be supplied to the air belt 24 from the end 24A on the retractor 14 side. That is, the flexible hose 36 is formed to have a curved shape (a folded back shape) when the seat belt 12 is not worn, and is gradually straightened to follow the extraction of the seat belt 12 when the seat belt 12 is worn. This allows a gas from the inflator 32 to be supplied to the end 24A of the air belt 24 in the seat back 16.

According to the air belt device 10 of the first embodiment, it is possible to suitably supply a gas to the air belt 24 without adversely affecting the wearability of the seat belt 12.

In the air belt device 10, also, the flexible hose 36 is originally formed to have a curved shape (a three-dimensional shape). Thus, it is possible to restrain the flow path from being narrowed at the folded portions of the flexible hose 36 during the initial stage of air bag deployment or gas supply compared to a hose that is formed by curving an initially straight tube. In addition, the flexible hose 36 is engaged with the seat back frame 16A at the engagement piece 40, which is provided on the inner circumferential side of the folded back portion 36A of the flexible hose 36. Thus, the engagement portion is prevented or restrained from blocking expansion of the flexible hose 36 due to a gas flow. In other words, it is possible to support the flexible hose 36 on the seat back 16 so that a collapse of the flow path in the flexible hose 36 is minimized. For the above reasons, a gas from the inflator 32 is supplied to the air belt 24 further suitably in the air belt device 10.

In the air belt device 10, further, the retractor 14 is disposed in the seat back 16. Thus, the relative positional relationship between the seat belt 12, which is worn by the seated occupant P, and the retractor 14, which takes up the seat belt 12, is generally constant independently of the position of the vehicle seat 11 in the longitudinal direction of the vehicle body. In addition, the inflator 32 is disposed in the seat back 16. Therefore, the relative positional relationship between the air belt 24 of the seat belt 12 and the flexible hose 36 also remains generally constant independently of the position of the vehicle seat 11 in the longitudinal direction of the vehicle body. For these reasons, the shape (attitude) of the flexible hose 36 is maintained and the wearing stroke Ss and the energy absorbing stroke Sa of the air belt 24 are secured independently of the position of the vehicle seat 11 in the longitudinal direction of the vehicle body, for example. Thus, it is possible to supply gas from the inflator 32 to the air belt 24 through the flexible hose 36 still further suitably.

In the air belt device 10, in particular, the retractor 14 is disposed in a lower portion of the seat back 16. Thus, it is possible to have a long length (a margin for wearing) of the portion of the air belt 24 accommodated in the seat back 16 when the seat belt 12 is not worn. That is, the wearing stroke Ss and the energy absorbing stroke Sa of the air belt 24 are secured. Consequently, in the air belt device 10, the occupant P may wear the seat belt 12 while the connection portion between the air belt 24 and the flexible hose 36 positioned in the seat back 16.

In the air belt device 10, in addition, the air belt 24 is deployed from the shoulder portion 16B of the seat back 16. Thus, it is possible to deploy the air belt 24 at a side of the head of the seated occupant P shortly after a side collision is detected.

A second embodiment of the present invention is described below. Components and elements that are substantially the same as those of the first embodiment are generally given the same reference symbols as those used in the first embodiment, and will not be described again.

Figure 7:
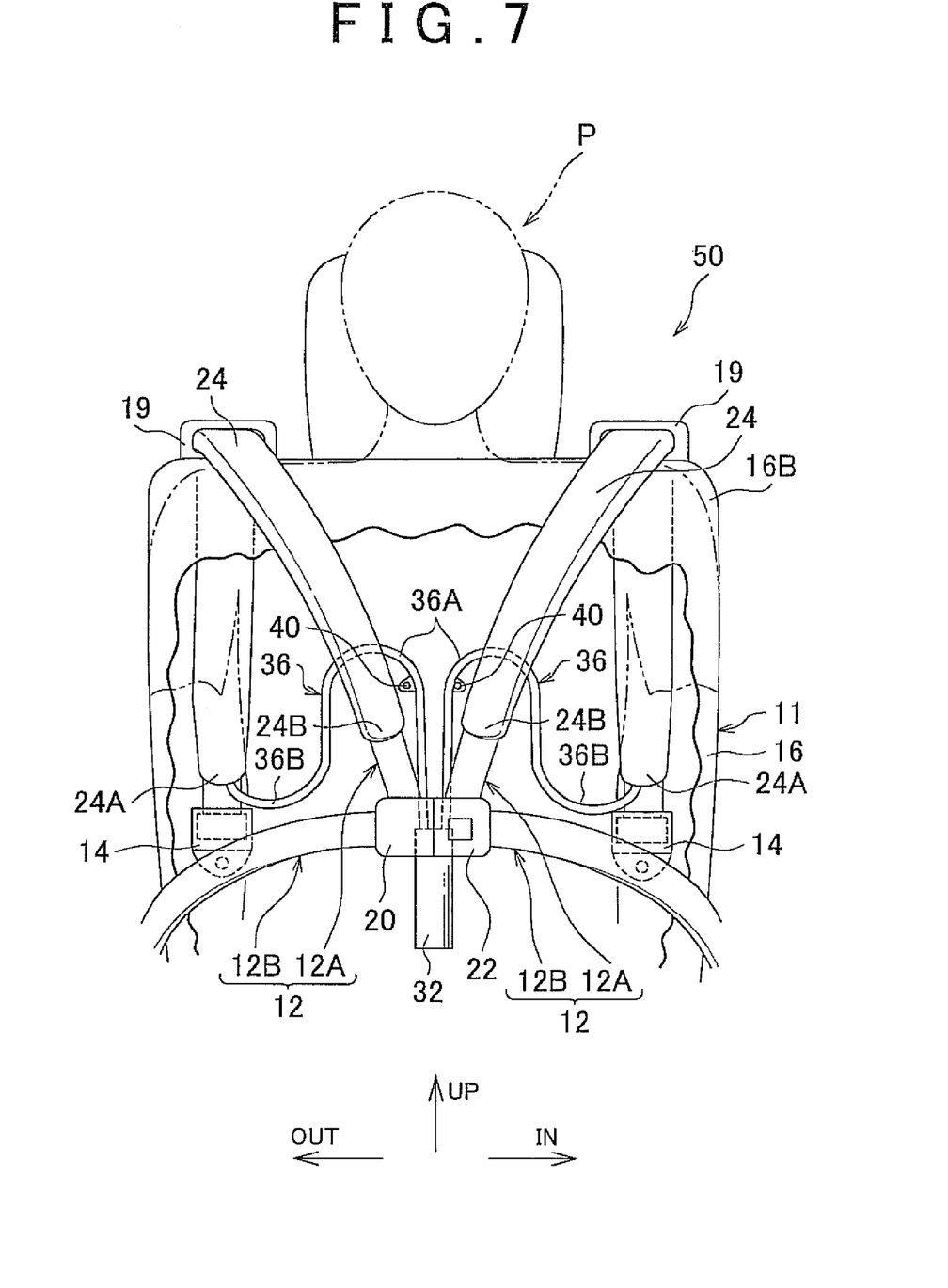
FIG. 7 is a front view that schematically shows a seat belt of an air belt device according to a second embodiment of the present invention when worn by an occupant.
Figure 8:
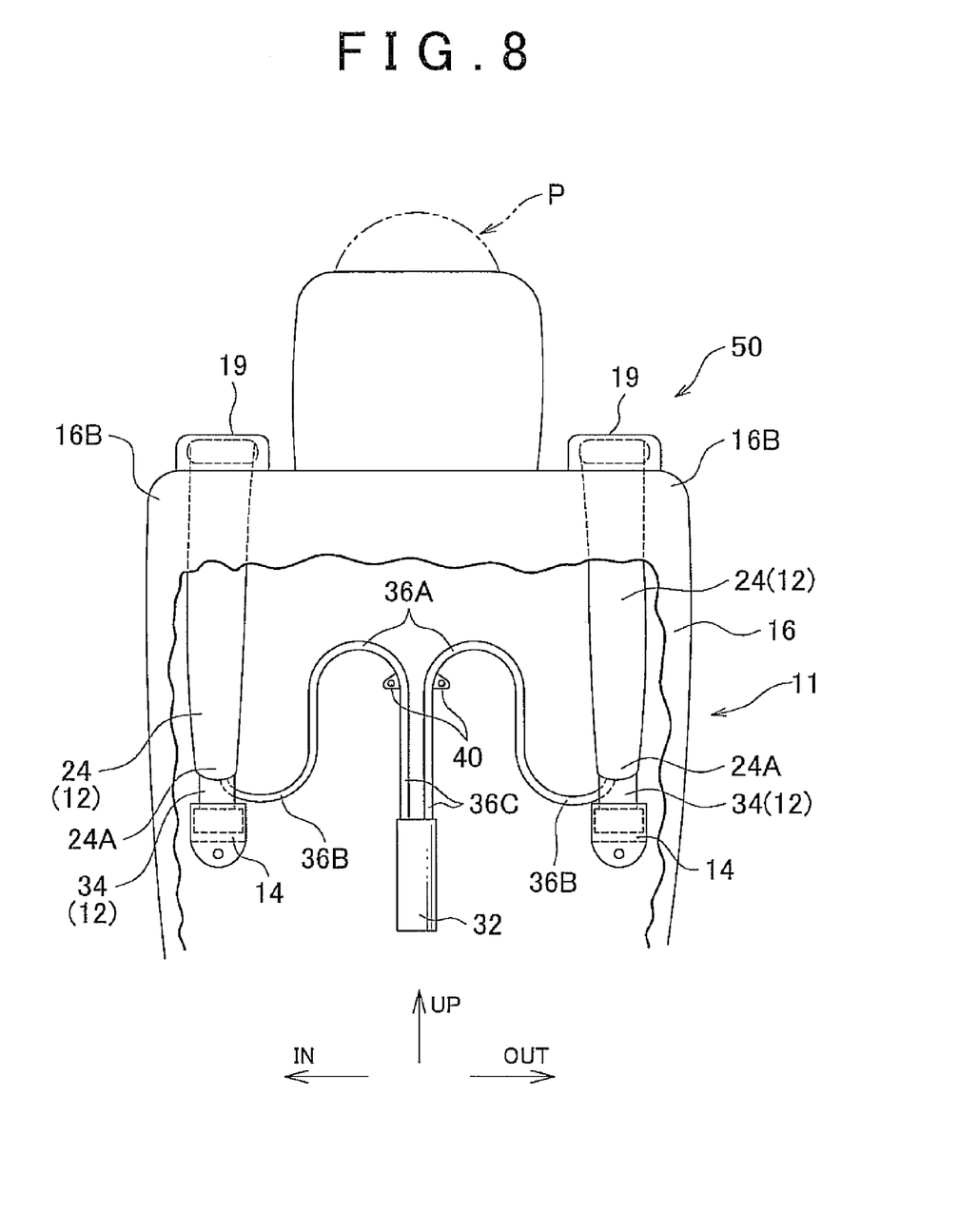
FIG. 8 is a rear view that schematically shows the seat belt of the air belt device according to the second embodiment of the present invention when worn by an occupant.

FIG. 7 is a front view that schematically shows an air belt device 50 according to a second embodiment of the present invention. FIG. 8 is a back view that schematically shows the air belt device 50. As shown in the drawings, the air belt device 50 differs from the air belt device according to the first embodiment in that it is a four-point restraint device that has a pair of left and right seat belts 12 and a pair of left and right air belts 24.

Specifically, the upper end of each of the left and right seat belts 12 is wound up in a retractor 14, and the lower end of each of the left and right seat belts 12 is fixed to a rear portion of a seat cushion 18 via an anchor 15. A tongue plate 20 is provided near the middle, in the vertical direction of the vehicle, of an exposed portion of one of the seat belts 12 when it is not worn. A corresponding buckle 22 is provided near the middle, in the vertical direction of the vehicle, of an exposed portion on the other seat belt 12 when it is not worn.

Consequently, when the tongue plate 20 of the air belt device 50 is engaged with the buckle 22, left and right shoulder belt portions 12A restrain the upper body of the occupant P seated on the vehicle seat 11 and left and right lap belt portions 12B restrain the waist of the seated occupant P, as shown in FIG. 7.

In the air belt device 50, the end 24A of each of the left and right air belts 24 in the seat back 16 is communicated with a common inflator 32 via a flexible hose 36. Components of the air belt device 50 other than those described above are the same as the corresponding components of the air belt device 10.

Thus, the air belt device 50 according to the second embodiment basically has the same functions to achieve the same effects as those of the air belt device 10 according to the first embodiment except for differences in occupant protection functions between a three-point restraint device and a four-point restraint device.

Figure 9A:
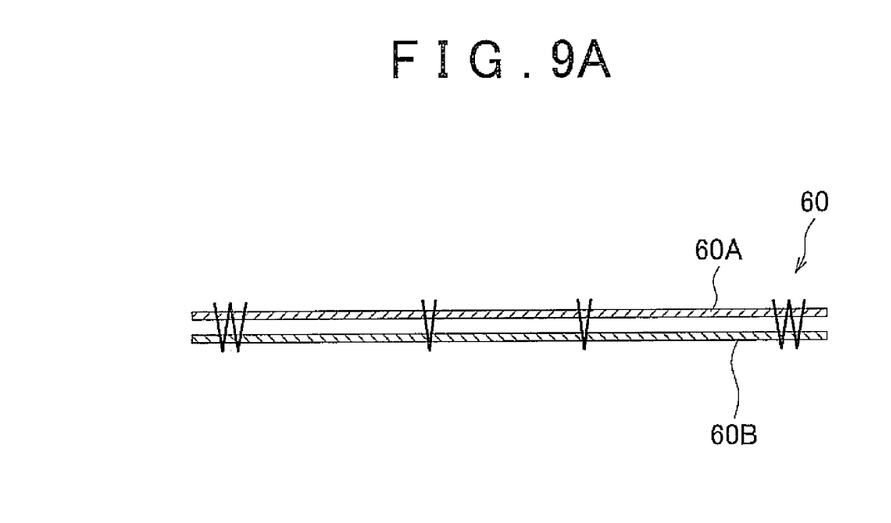
FIG. 9A shows a cross-sectional view of a modification of the flexible hose that forms the air belt device according to the first embodiment of the present invention, when gas is not flowing through the flexible hose.
Figure 9B:
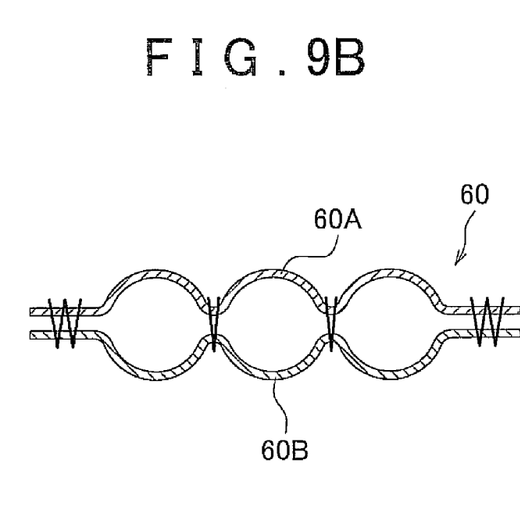
FIG. 9B shows cross-sectional view of a modification of the flexible hose that forms the air belt device according to the first embodiment of the present invention, when gas flows through the flexible hose.

In the embodiments described above, the flexible hose 36 may be formed by sewing the base materials 38A and 38B together along the sides in the length direction. However, the present invention is not limited thereto, and a flexible hose 60 obtained by sewing base materials 60A and 60B at not only both ends but also middle portions in the width direction as shown in FIG. 9A, for example, may be used as a flexible flow path member. As shown in FIG. 9B, an expand thickness of the flexible hose 60 is reduced when a gas flows through. In a configuration in which a portion of the flexible hose 60 passes through the belt guide 19 to come out to the back rest side as shown in FIG. 3, for example, the flexible hose 60 smoothly passes through the belt guide 19. Accordingly, gas flows through the flexible hose 60 at a high rate compared to the flexible hose 36. The flexible hose 36 (the flexible hose 60) is not limited to a hose obtained by joining the base materials 38A and 38B (the base materials 60A and 60B) with the same configuration as the base material that forms the air bag 30, instead a flexible tubular member with no seams in the circumferential direction, for example, may be used as the flexible hose.

Further, in the embodiments described above, the retractor 14 and the inflator 32 are disposed in the seat back 16. However, the present invention is not limited thereto, and the retractor 14 and the inflator 32 may be provided in a side trim panel, a rear package tray, or the like when the present invention is applied to a rear seat, for example. The retractor 14 may be provided in a rear portion of the seat cushion 18, under a seat surface (below the seat back 16), or the like to lengthen the wearing stroke Ss and the energy absorbing stroke Sa.

What is claimed is:

1. An occupant restraint device comprising:
    a seat belt that restrains an occupant, wherein the seat belt includes an expandable portion provided at a portion of the seat belt that extends from a shoulder portion to a waist portion, and the expandable portion expands when supplied with gas;
    a retractor that allows the seat belt to be extracted and wound up from a side of the shoulder portion;
    an inflator that supplies the gas to the expandable portion; and
    a flow path member that is flexible, and that communicates an end of the expandable portion oriented towards the retractor with the inflator, wherein the flow path member has a curved shape, the flow path member is supported on a seat at a supported portion that is positioned at a part of the flow path member that is nearest the inflator at an inner circumferential side of a curved portion of the flow path member, the part of the flow path member that is nearest the inflator at the curved portion of the flow path member is a first folded back portion;
    wherein the supported portion is positioned at a side of the inflator on the first folded back portion and at an inner circumferential side of the first folded back portion.

2. The occupant restraint device according to claim 1, wherein the retractor and the inflator are disposed in a seat back.

3. The occupant restraint device according to claim 2, wherein the retractor is disposed in a lower portion of the seat back in a vertical direction of a seat.

4. The occupant restraint device according to claim 1, wherein a base material of the flow path member at the outer circumferential side of the curved portion is longer than a base material of the flow path member at the inner circumferential side of the curved portion.

5. The occupant restraint device according to claim 1, wherein:
    the flow path member includes a a second folded back portion provided downstream of the first folded back portion in a direction in which the gas flows; and
    the first folded back portion is positioned above the second folded back portion in a vertical direction of a seat back, when the expandable portion is not expanded.

* * * * *